United States Patent [19]

Furth

[11] Patent Number: 4,529,121

[45] Date of Patent: Jul. 16, 1985

[54] APPARATUS FOR ACTUATING THE TEMPERATURE SETTING MEANS OF A WATER HEATER

[76] Inventor: Arthur Furth, Celsiusstraat 183, 2041 TH Zandvoor, Netherlands

[21] Appl. No.: 610,161

[22] Filed: May 14, 1984

[51] Int. Cl.³ .......................... H05B 3/02; F23M 1/08
[52] U.S. Cl. ................................ 236/46 R; 219/334; 236/20 R; 337/305
[58] Field of Search ............... 236/46 R, 20 R, 47, 236/78 C; 337/305, 302; 219/492, 334

[56] References Cited

U.S. PATENT DOCUMENTS 4,016,402  4/1977  Scott ........................... 219/334
4,041,325  8/1977  Angott ........................ 236/46 R X
4,139,153  2/1979  Engholdt ..................... 236/78 C Primary Examiner—William E. Wayner
Attorney, Agent, or Firm—Kane, Dalsimer, Kane, Sullivan and Kurucz

[57] ABSTRACT

An apparatus for actuating the temperature setting means of a water heater is provided with a drive motor (2) adapted to move the temperature setting means from a low to a high temperature setting and vice versa. The drive motor (2) is connected to a power supply through a switching means (14). The switching means (14) is operable by a programmable timer (15) in such a manner that the temperature setting means is set on a high temperature only during at least one desired period.

4 Claims, 5 Drawing Figures

APPARATUS FOR ACTUATING THE TEMPERATURE SETTING MEANS OF A WATER HEATER

The invention relates to an apparatus for actuating the temperature setting means of a water heater.

At the usual water heaters the temperature setting means is actuatable by means of a manually operable knob. The user of the water heater generally sets only once a desired water temperature by means of said knob, which temperature is continuously maintained during operation of the water heater. However, in general only during some periods each 24 hours large amounts of hot water are used, such as for example in the morning for showering. This means for that the most part of each 24 hours energy is unnecessarily used to maintain the high temperature of the hot water supply.

The invention aims to provide an apparatus of the above-mentioned kind at which said disadvantage is obviated in a simple but nevertheless effective manner.

According to the invention an apparatus for actuating the temperature setting means of a water heater is provided, comprising a drive motor adapted to move the temperature setting means from a low to high temperature setting and vice versa, said drive motor being connected to a power supply through a switching means operable by a programmable timer in such a manner that the temperature setting means is set on a high temperature only during at least one desired period.

In this manner an apparatus is obtained which can be programmed by means of the timer in such a manner that the hot water supply is maintained at the high temperature set only during the period or periods during which large amounts of hot water are used. After these period(s) the drive motor moves the temperature setting means to a low temperature setting so that except for this (these) period(s) substantially no energy is used. Thereby, a substantial energy saving can be realised.

According to an embodiment of the apparatus the switching means consists of a change-over switch operable by the timer and the drive motor is equiped with two motor coils which at energizing provide for a rotation of a driving shaft adapted to be coupled to the temperature setting means in a first direction and a second opposite direction, respectively, and which are connected to the power supply through said change-over switch common to both coils, a first switch for determining the low temperature setting being connected in the supply line of the first motor coil and a second switch for determining the high temperature setting being connected in the supply line of the second motor coil, said first and second switches being actuated by the driving shaft.

Preferably, said first and second switches each are formed as a mechanical operable on/off switch mounted at the circumference of an actuating disc fixed on the driving shaft, said actuating disc having an actuating means for actuating said switches.

In this manner a very simple apparatus is obtained which shows a reliable operation and can be manufactured against relatively low costs.

According to a favourable embodiment, said second switch is mounted on a support rotatable concentrically with the actuating disc, wherein said support can be set manually, whereby the high temperature can be set by the user at a desired value.

The invention will hereinafter be further explained by reference to the drawings in which an embodiment of the apparatus according to the invention is shown.

Figure 1:
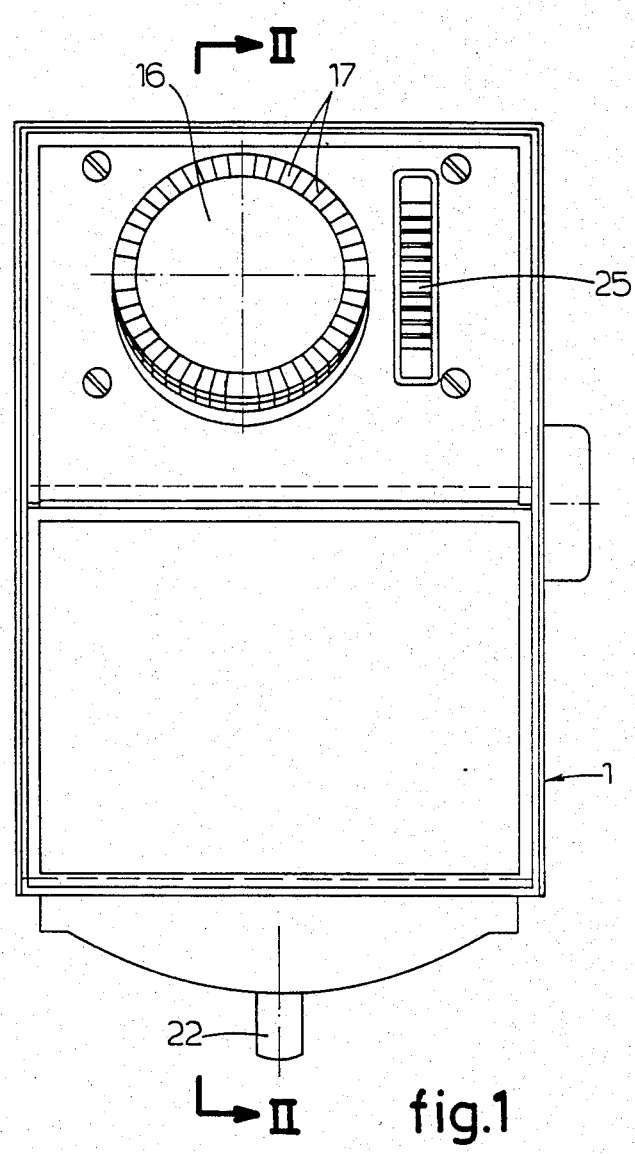
FIG. 1 shows a top view of an embodiment of the apparatus according to the invention.

Referring to the drawings there is shown an apparatus for actuating the temperature setting means of a water heater, said water heater not being shown. Such a water heater or boiler may be provided with a gas control for switching the gas supply to the burner of the apparatus, said gas control being driven by the water temperature. The water temperature desired can be set by the temperature setting means.

The apparatus shown in the drawings comprises a casing 1 in which a drive motor 2 is mounted. A shaft 3 of the drive motor 2 is coupled to a driving shaft 5 through a transmission 4, an actuating disc 6 being fixed on the driving shaft 5. As appears from the bottom view of FIG. 3, the actuating disc 6 is provided with a recess 7 at its side opposite of the driving shaft 5. The actuating disc 6 engages with this recess 7 the temperature setting means when the apparatus is mounted on the water heater. Thereby, the drive motor 2 can move the temperature setting means from a low to a high temperature setting and vice versa.

Figure 5:
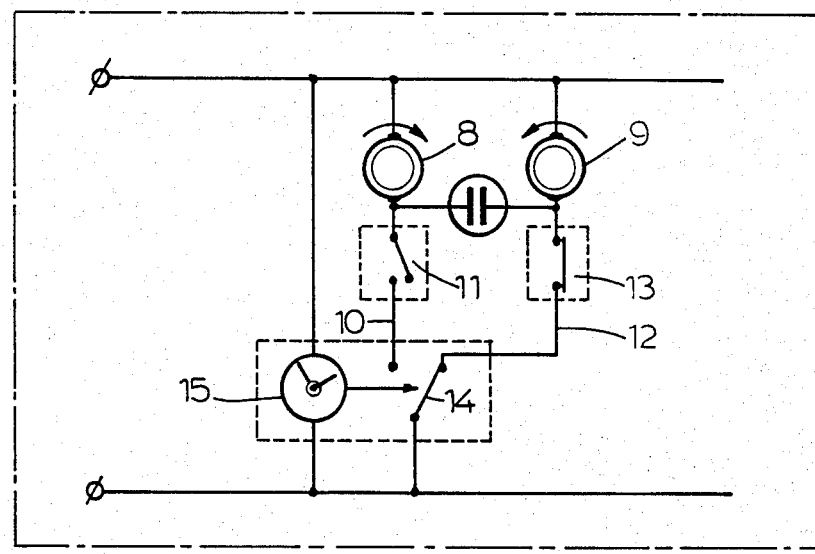
FIG. 5 shows a circuit diagram showing the connection of the drive motor of the apparatus according to the invention.

To this end, the drive motor 2 is equiped with two motor coils 8 and 9 at the embodiment shown, said motor coils 8 and 9 being schematically shown in the circuit diagram of FIG. 5. At energizing the motor coil 8 the driving shaft 5 will rotate in a first direction and at energizing the motor coil 9 the driving shaft 5 will rotate in the opposite direction, whereby the movement of the temperature setting means to the desired temperature setting is realised.

As appears from FIG. 5, a first switch 11 is connected in the supply line 10 of the motor coil 8, while a second switch 13 is connected in the supply line 12 of the second motor coil 9. Both switches 11, 13 made as normal mechanical on/off switches are connected to a power supply not shown through a common change-over switch 14. The change-over switch 14 is operable by a programmable timer 15 directly connected to the power supply. The timer 15 is provided with a programming disc 16 (see FIG. 1 and 2) having a large number of slides 17, wherein the fact whether the slides 17 are shifted downwardly or not determines whether the change-over switch 14 is in the one or the other position. The timer 15 with the change-over switch 14 is a commercially available component so that it is not necessary to further describe this component.

Figure 2:
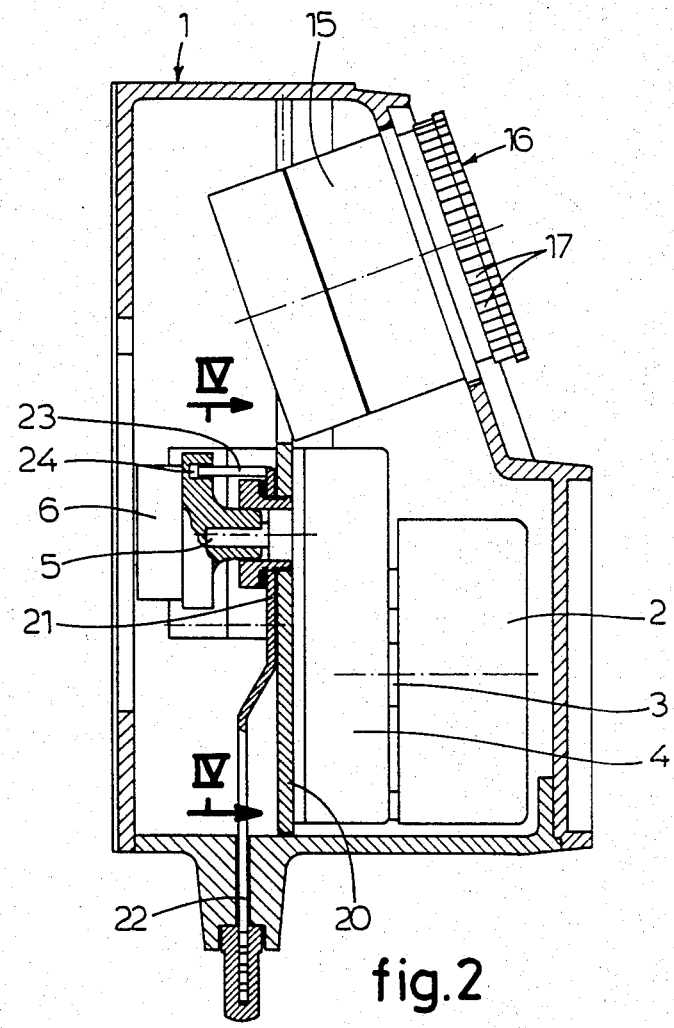
FIG. 2 shows a cross-section according to the line II—II in FIG. 1.
Figure 3:
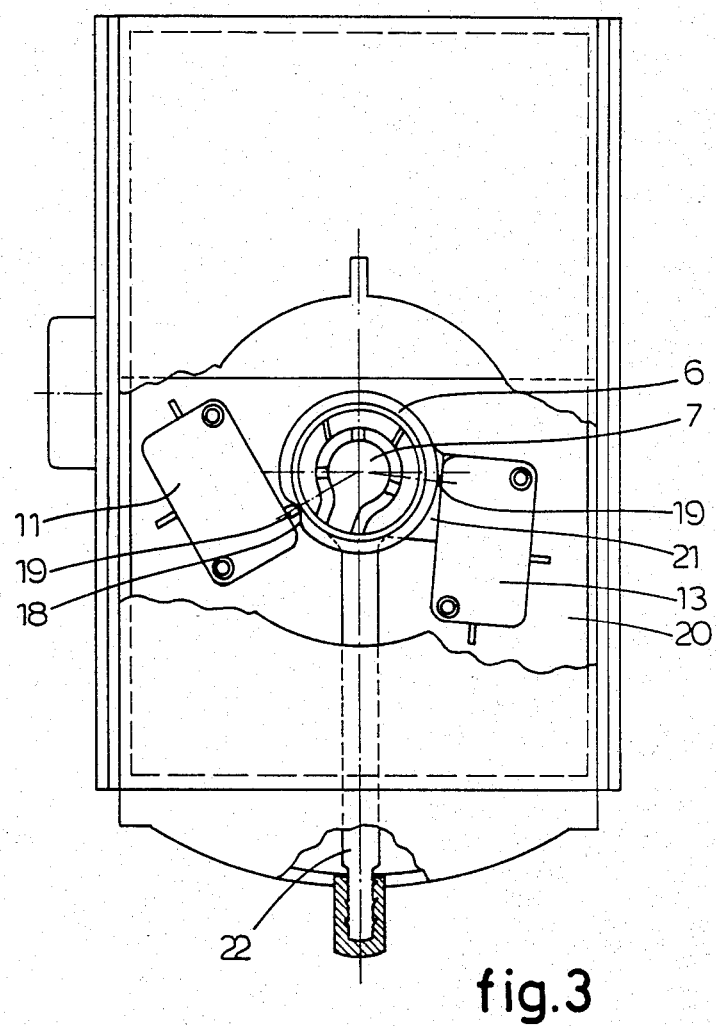
FIG. 3 shows a bottom view of the apparatus of FIG. 1 in which a bottom plate is partially broken away.
Figure 4:
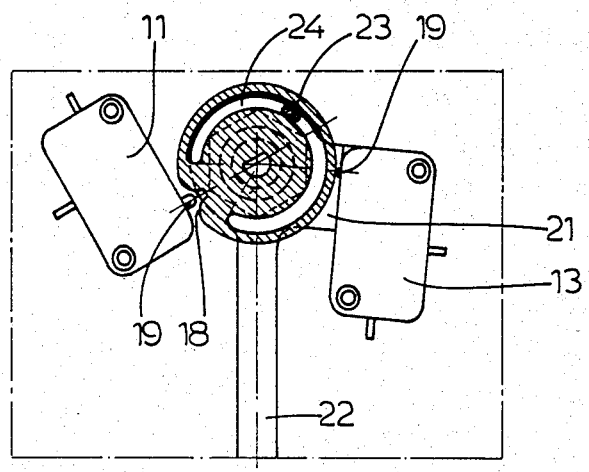
FIG. 4 shows a partial cross-section of the apparatus according to the line IV—IV in FIG. 2.

Both switches 11, 13 are mounted at the circumference of the actuating disc 6, the circumference of which has a recess 18 by means of which a switching cam 19 of the switches 11, 13 can be operated. When the switching cam 19 of the switch 11 or 13 engages the recess 18, the corresponding switch is opened. The switch 11 which determines the low temperature setting is fixed on an intermediate plate 20 lying within the casing. The corresponding fixed low temperature setting can be for example 20°–25° C., whereby freezing of the water supply is prevented if the water heater is located in a cold room. Further, there is hardly any heatloss by radiation to the environment at this temperature. The switch 13 which determines the high temperature setting is mounted on a support 21 rotatable concentrically with the actuating disc 6 as shown in FIG. 2 and 3. The support 21 comprises a setting arm 22 which projects out of the casing 1 and by which the position of the switch 10 with respect to the actuating disc 6 can be set. Thereby, the user can set the high temperature between approximately 40° and 80° C.

The operation of the above-described apparatus will now be explained:

It is assumed that the temperature setting means is in the high temperature position so that the switch 13 is open as the switch cam 19 engages the recess 18 of the actuating disc 6 in this case. As soon as the time during which a high temperature setting is desired, which time is programmed by means of the slides 17 is elapsed, the timer 15 switches the change-over switch 14 to the switch 11 which is in the closed position as the switch cam 19 of the switch 11 is pushed down by the actuating disc 6. Thereby, the motor coil 8 is energized so that the driving shaft 5 will move the temperature setting means to the low temperature setting which will be reached as soon as the switch cam 19 of the switch 11 engages the recess 18 of the actuating disc 6, which position is shown in FIG. 3. The switch 11 will than be opened so that the drive motor 2 stops. The switch 13 is now closed so that as soon as a period programmed by the slides will be reached, in which period a high temperature setting is desired, the motor coil 9 will be energized when the change-over switch 14 switches to the switch 11 so that the drive motor 2 will move a temperature setting means to the high temperature setting.

In order to prevent that during a period in which the temperature setting means is in the high temperature position, a low temperature setting will be chosen by moving the setting arm 22, a protection is provided for preventing rotation of the support 21 to a low temperature setting if the actuating disc 6 is in a position corresponding to a high temperature setting. To this end the support 21 is provided with an upwardly projecting pin 23 which engages an arcuate slot 24 formed in the actuating disc 6. The dimension and location of the slot 24 has been chosen in such a manner that the desired blocking of the support 21 is reached if the actuating disc 6 is in the position corresponding to a high temperature setting.

The above-described apparatus provides for such an automatic actuation of the temperature setting means of a water heater that the water supply will be maintained at a desired high temperature only during predetermined periods which can be set by means of the slides. In case of a usual household the timer could for example be programmed in such a manner that the high temperature setting will only be chosen in the morning between 6.00 and 8.00 a.m. and in the evening between 18.00 and 20.00 p.m. During the remaining time the temperature setting means is set at the low temperature so that hardly no energy will be used whereby a substantial energy saving will be obtained. The need for hot water in the intermediate periods can normally be covered plentifully by the amount of hot water present after the set periods.

The change-over switch 14 can also be operated manually by means of a sliding knob 25 so that a high or a low temperature setting can be chosen independent of the program.

The invention is not restricted to the above-described embodiment which can be varied in a number of ways within the scope of the invention.

I claim:

1. An apparatus for actuating temperature setting means of a water heater comprising:
   a drive motor having first and second coils for operating the motor in a first and second direction respectively;
   a drive shaft rotatably coupled to said motor;
   an actuating disc affixed to said drive shaft and coupled to said temperature setting means to move said temperature setting means between a first position corresponding to a low temperature and a second position corresponding to a high temperature, said actuating disc having switch actuating means on its circumference;
   first and second switches operatively connected to said first and second coils respectively and peripherally disposed with respect to said disc for activation by said switch activation means for determining said first and second positions; said second switch being mounted on a support rotatable concentrically with the actuating disc said support being manually settable;
   switch-over means for providing power to one of said first and second switches; and
   a programmable timer for operating said switch-over means at preselected time intervals.

2. Apparatus according to claim 1, wherein said support has an upwardly directed pin engaging a arcuate slot formed in the actuating disc, said slot preventing a rotation of the support to a lower temperature setting when the actuating disc is in a position in which its actuating means cooperates with the second switch.

3. Apparatus according to claim 1, wherein the actuating disc is provided with a recess at its side opposite of the driving shaft, said recess being adapted to engage the temperature setting means in the mounted position of the apparatus.

4. Apparatus according to claim 1, wherein said change-over switch is also manually operable.

* * * * *